US012735879B2

(12) United States Patent
Zhang

(10) Patent No.: US 12,735,879 B2
(45) Date of Patent: Sep. 15, 2026

(54) BOUNCING DRAINER

(71) Applicant: Xiamen Aomute Technology Co., Ltd, Xiamen (CN)

(72) Inventor: Shengwu Zhang, Xiamen (CN)

(73) Assignee: Xiamen Aomute Technology Co., Ltd, Xiamen (CN)

( * ) Notice: Subject to any disclaimer, the term of this patent is extended or adjusted under 35 U.S.C. 154(b) by 416 days.

(21) Appl. No.: 18/447,099

(22) Filed: Aug. 9, 2023

(65) Prior Publication Data

US 2025/0019950 A1 Jan. 16, 2025

(30) Foreign Application Priority Data

Jul. 14, 2023 (CN) ......................... 202321851972.2

(51) Int. Cl.

| | |
|---|---|
| ***E03C 1/262*** | (2006.01) |
| ***B01D 29/11*** | (2006.01) |
| ***B01D 29/96*** | (2006.01) |

(52) U.S. Cl.

CPC .............. *E03C 1/262* (2013.01); *B01D 29/11* (2013.01); *B01D 29/96* (2013.01); *B01D 2201/347* (2013.01)

(58) Field of Classification Search

CPC .............. A47K 1/14; E03C 1/22–2308; E03C 1/26–262; E03C 2001/2311–2317

See application file for complete search history.

(56) References Cited

U.S. PATENT DOCUMENTS

| | | | | |
|---|---|---|---|---|
| 2,668,962 A * | 2/1954 | Spector | E03C 1/262 | 4/287 |
| 9,027,172 B2 * | 5/2015 | Fima | E03C 1/298 | 4/287 |
| 2006/0195976 A1 * | 9/2006 | McAlpine | E03C 1/2306 | 4/287 |
| 2010/0005581 A1 * | 1/2010 | McAlpine | E03C 1/262 | 4/291 |
| 2014/0075662 A1 * | 3/2014 | Gayoso | E03C 1/2306 | 4/292 |

FOREIGN PATENT DOCUMENTS

| | | | |
|---|---|---|---|
| GB | 2373182 * | 9/2002 | E03C 1/232 |
| WO | WO2014138783 * | 9/2014 | E03C 1/2306 |

* cited by examiner

*Primary Examiner* — David P Angwin
*Assistant Examiner* — Nicholas A Ros
(74) *Attorney, Agent, or Firm* — Westbridge IP LLC

(57) ABSTRACT

A bouncing drainer includes a bouncing machine core and a water filter basket assembly. The bouncing machine core is inverted, where one end with a protruding tip facing upwards and the other end facing downwards, so as to avoid the interference between the protruding tip and a drainage outlet. The water filter basket assembly includes a sleeve, a water filter basket, and a sealing ring. The sleeve is mounted at the top of the bouncing machine core in a sleeving manner, and wraps the protruding tip of the bouncing machine core. The water filter basket and the sealing ring are mounted on the sleeve in sequence from top to bottom. According to the application, through the adoption of the inverted bouncing machine core, which solves the problem that a traditional bouncing drainer is not suitable for some vegetable washing basins.

8 Claims, 8 Drawing Sheets

BOUNCING DRAINER

CROSS-REFERENCE TO RELATED APPLICATIONS

This application claims priority to Chinese Patent Application No. 202321851972.2, filed on Jul. 14, 2023, which are incorporated herein by reference in their entirety.

TECHNICAL FIELD

The application relates to the technical field of basin drainage, in particular to a drain plug assembly.

BACKGROUND

A drain plug assembly is mainly used in a kitchen vegetable washing basin, and generally includes a water filter basket assembly and a drain stem. The drain stem is vertically mounted in a drainage outlet of the vegetable washing basin, and the water filter basket assembly is mounted on the drain stem, so that the drainage outlet of the vegetable washing basin is blocked and opened with the up and down switching of the drain stem. At present, the drain stem on the market is basically of a switching structure of a limiting hook, as shown in FIG. 9, a bottom end of the drain stem 1 is provided with a protruding tip 11 configured to mount the limiting hook, the protruding tip 11 cannot be provided with a thread, and a top end of the drain stem is a pressing end. During mounting, the end having the protruding tip 11 faces downwards, protrudes out of the thread, and is fixedly mounted in the drainage outlet of the vegetable washing basin, and the top end faces upwards and is configured to mount a vegetable washing basin assembly. The mounting manner has the following problems that, for some vegetable washing basins with a relatively small thickness of an interlayer of the drainage outlet, especially products on the American market, the depth of a shell of the drainer is generally shallower than the domestic standard, the internal space of the drainer is narrow, the thickness of the interlayer of the drainage outlet is also relatively small, and the protruding tip may interfere with a rib of the drainage outlet or the bottom interlayer, resulting in the incapability of mounting the drain plug assembly.

SUMMARY

In order to solve the above technical problems, the application provides a structure of a drain plug assembly with better adaptability.

A drain plug assembly includes a drain stem and a water filter basket assembly.

The drain stem is inverted, where one end with a protruding tip facing upwards and the other end facing downwards, so as to avoid the interference between the protruding tip and a drainage outlet.

The water filter basket assembly includes a sleeve, a water filter basket, and a sealing ring. The sleeve is mounted at the top of the drain stem in a sleeving manner, and wraps the protruding tip of the drain stem. The water filter basket and the sealing ring are mounted on the sleeve in sequence from top to bottom.

According to the application, through the adoption of the inverted drain stem, the protruding tip which may interfere with the drainage outlet faces upwards to be accommodated in the water filter basket assembly with larger design space, which solves the problem that a traditional drain plug assembly is not suitable for some vegetable washing basins.

Preferably, for ease of use, the water filter basket assembly further includes a handle. The handle is arranged at a top end of the sleeve.

Preferably, the top end of the sleeve is provided with a boss, and both sides of the boss are provided with an articulated shaft. A bottom end of the handle is provided with a U-shaped opening, and both sides of the U-shaped opening are provided with through strip-shaped holes. The U-shaped opening of the handle is hinged to the boss through the strip-shaped holes and the articulated shaft. The handle may swing, for example, in a vertical state or flat state, when the water filter basket has too much clutter, the handle is erected to facilitate the lifting of the water filter basket, and when cleaning items are placed in the vegetable washing basin, the handle is laid flat to avoid being touched, and the normal use of the vegetable washing basin is not affected.

Preferably, the articulated shaft is fixedly arranged on both sides of the sleeve, the U-shaped opening of the handle is opened through deformation, and the articulated shaft is clamped into the strip-shaped holes.

Preferably, the top of the boss is provided with a limiting protrusion, and a bottom surface of the U-shaped opening of the handle is provided with a limiting groove. When in use, the handle is vertically pulled up and down, the limiting protrusion is clamped or inserted into the limiting groove, the handle remains vertical, or, the handle is vertically pulled up, the limiting protrusion is separated from the limiting groove, and the handle is laid flat by swinging the handle.

Preferably, an upper side of an end of the articulated shaft is an inclined plane, which facilitates the assembly of the handle.

Preferably, a lower part of the sleeve is provided with an annular boss, and the water filter basket is arranged on the annular boss and pressed by a pressing ring. The pressing ring and the sleeve are assembled through a thread.

Preferably, the sealing ring and the pressing ring are integrally formed, or the sealing ring is arranged in a ring groove on the pressing ring in a sleeving manner.

Preferably, the sleeve and the drain stem are assembled and matched through lapped joint.

Preferably, the water filter basket is made of plastic or stainless steel.

Preferably, a top surface of the sealing ring is provided with a radial reinforcing rib, which may improve the sealing degree during water plugging.

According to the above description of the application, the application has the following beneficial effects.

1. Through the adoption of the inverted drain stem, the protruding tip which may interfere with the drainage outlet faces upwards to be accommodated in the water filter basket assembly with larger design space, which solves the problem that a traditional drain plug assembly is not suitable for some vegetable washing basins.

2. When the water filter basket has too much clutter, the handle is erected to facilitate the lifting of the water filter basket, and when cleaning items are placed in the vegetable washing basin, the handle is laid flat to avoid being touched, and the normal use of the vegetable washing basin is not affected.

3. The water filter basket and the sealing ring are together assembled on the sleeve, and the water filter basket and the sealing ring are lifted together to facilitate the cleaning of the filter water basket and the sealing ring.

BRIEF DESCRIPTION OF THE DRAWINGS

The drawings described herein are used to provide a further understanding of the application, and constitute a part of the application, and the exemplary embodiments of the application and the description thereof are intended to explain the application and do not constitute an undue limitation on the application.

DETAILED DESCRIPTION OF THE EMBODIMENTS

In order to make the technical problems, technical solutions and beneficial effects to be solved by the application clearer, the application will be further described below in detail in conjunction with the drawings and embodiments. It is to be understood that the specific embodiments described herein are only used to illustrate the application, but are not intended to limit the application.

Referring to FIG. 1 to FIG. 8, a drain plug assembly includes a drain stem 1 and a water filter basket assembly 2.

Figure 1:
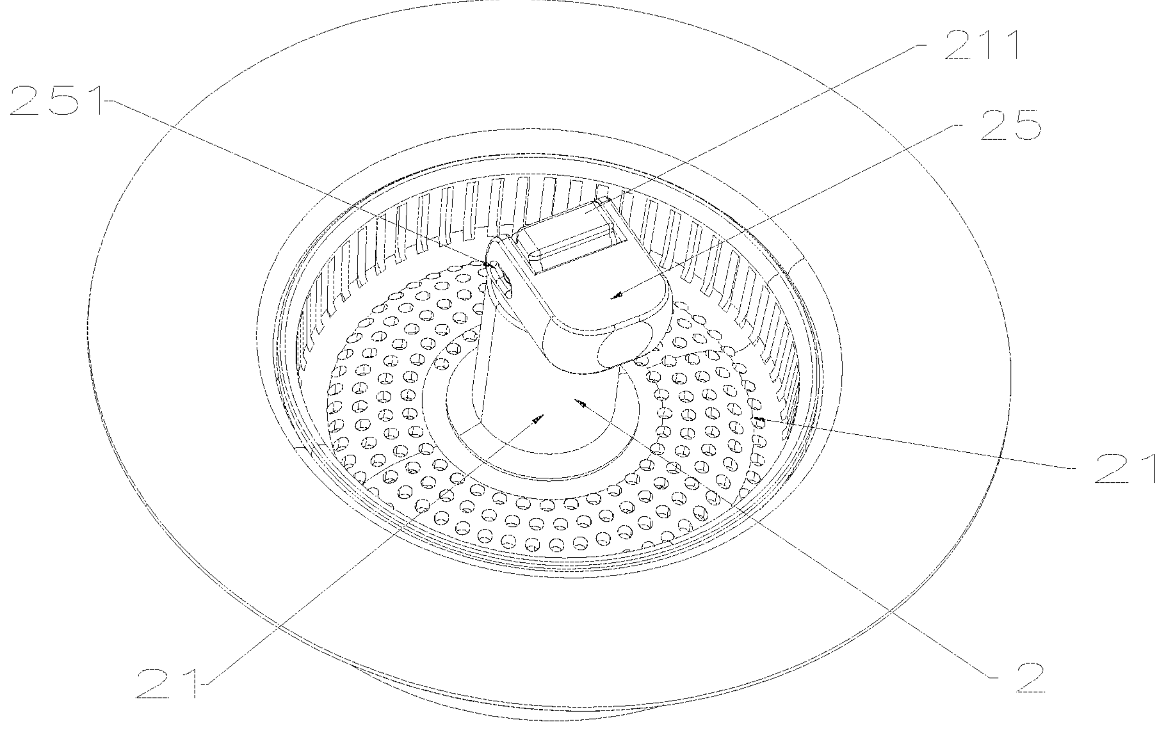
FIG. 1 is a first axial side view of a drain plug assembly.
Figure 2:
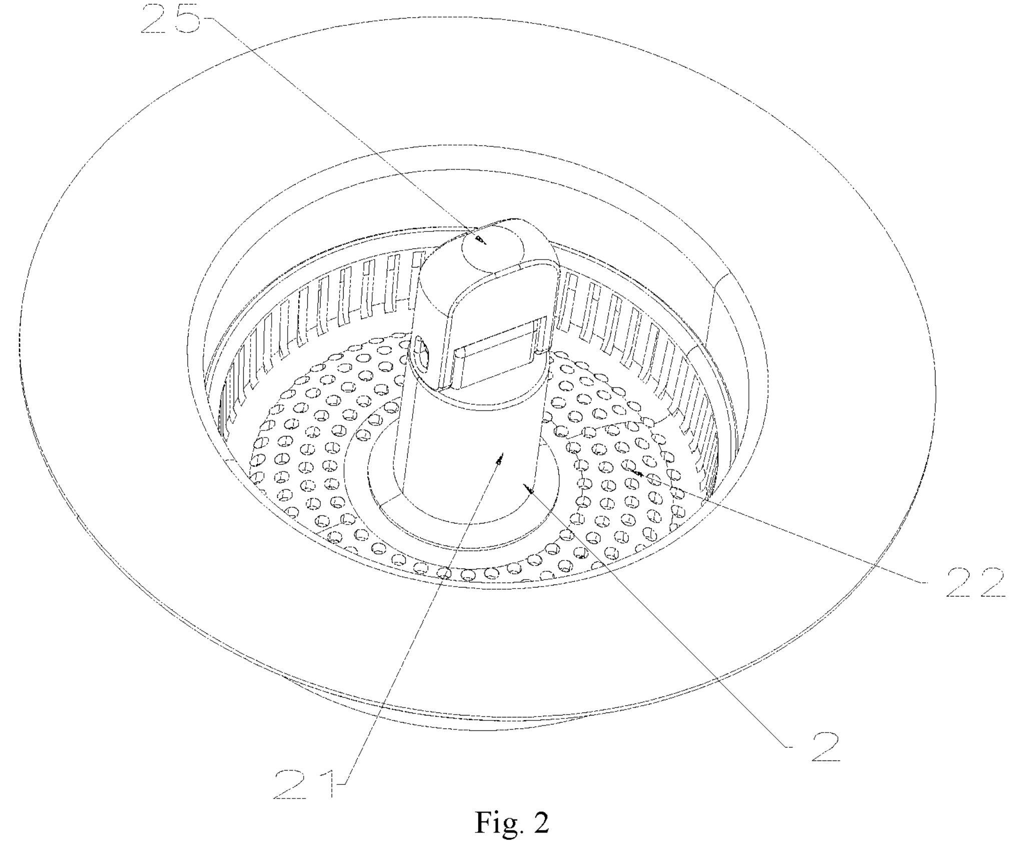
FIG. 2 is a second axial side view of a drain plug assembly.
Figure 3:
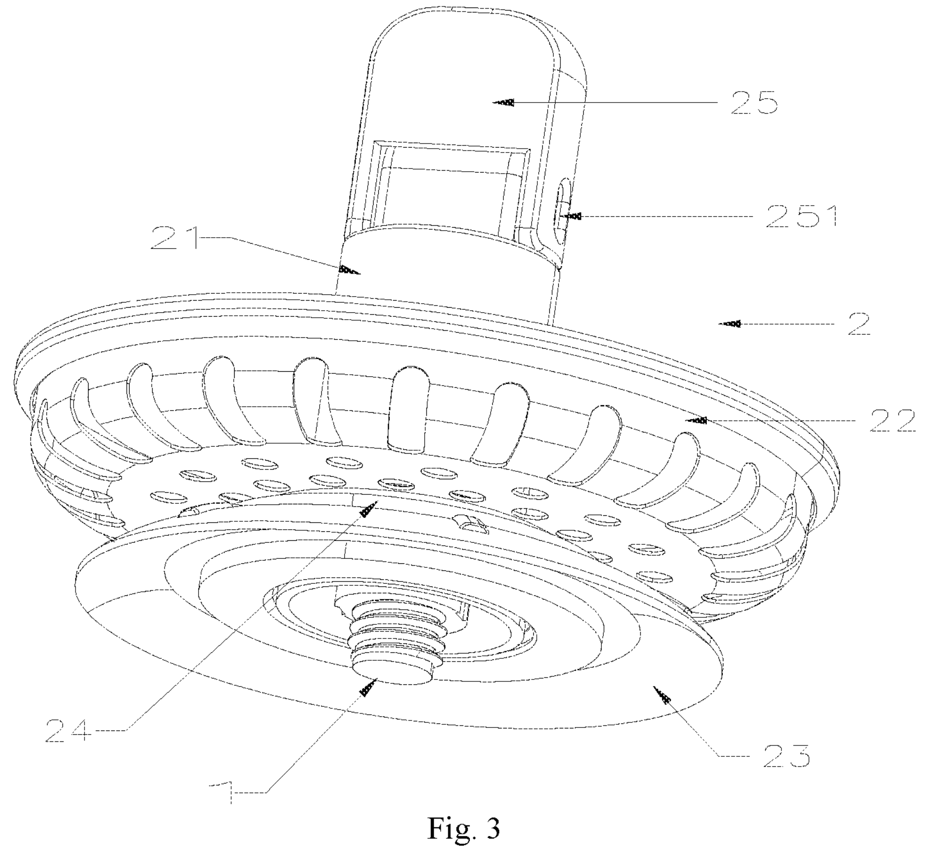
FIG. 3 is a third axial side view of a drain plug assembly.
Figure 4:
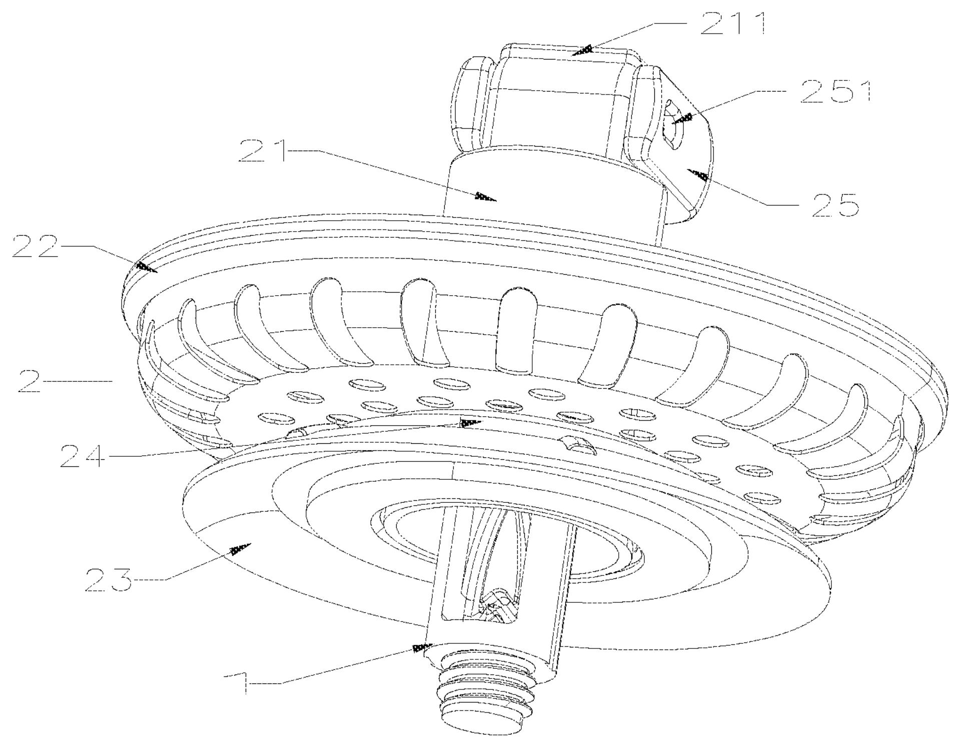
FIG. 4 is a fourth axial side view of a drain plug assembly.
Figure 5:
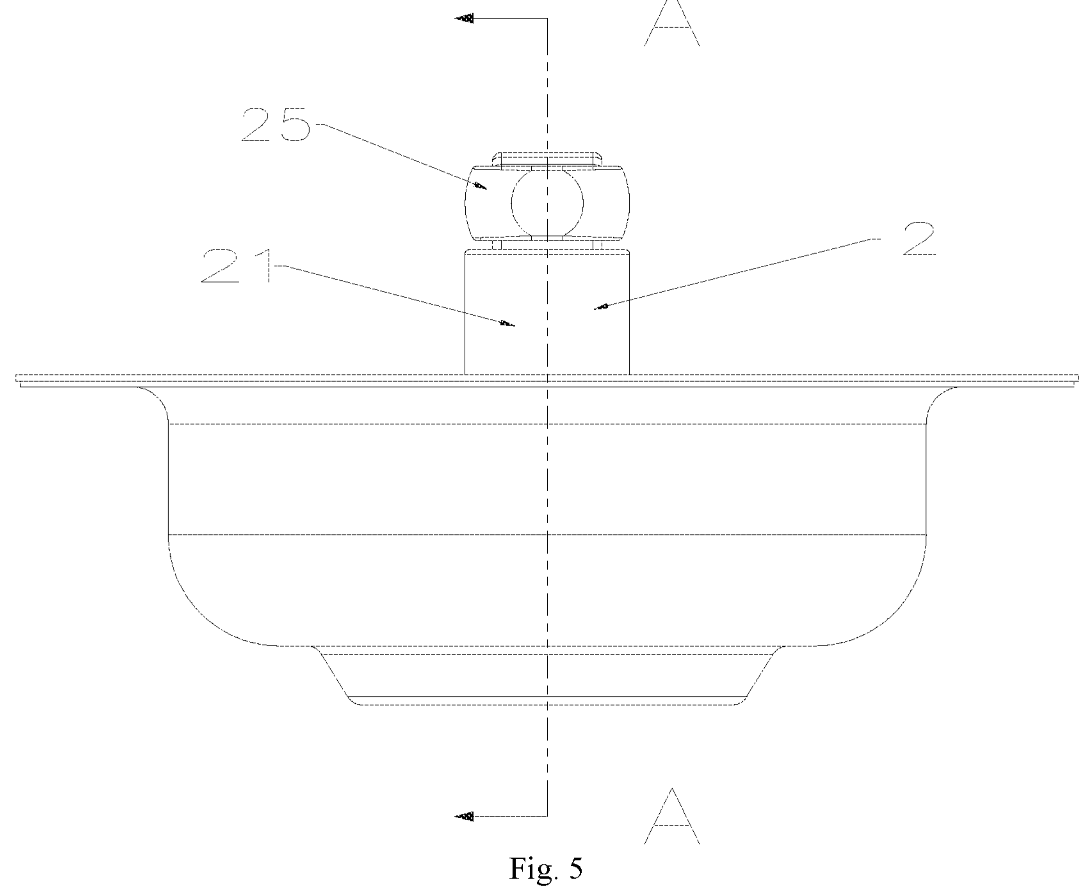
FIG. 5 is a front view of a drain plug assembly.
Figure 6:
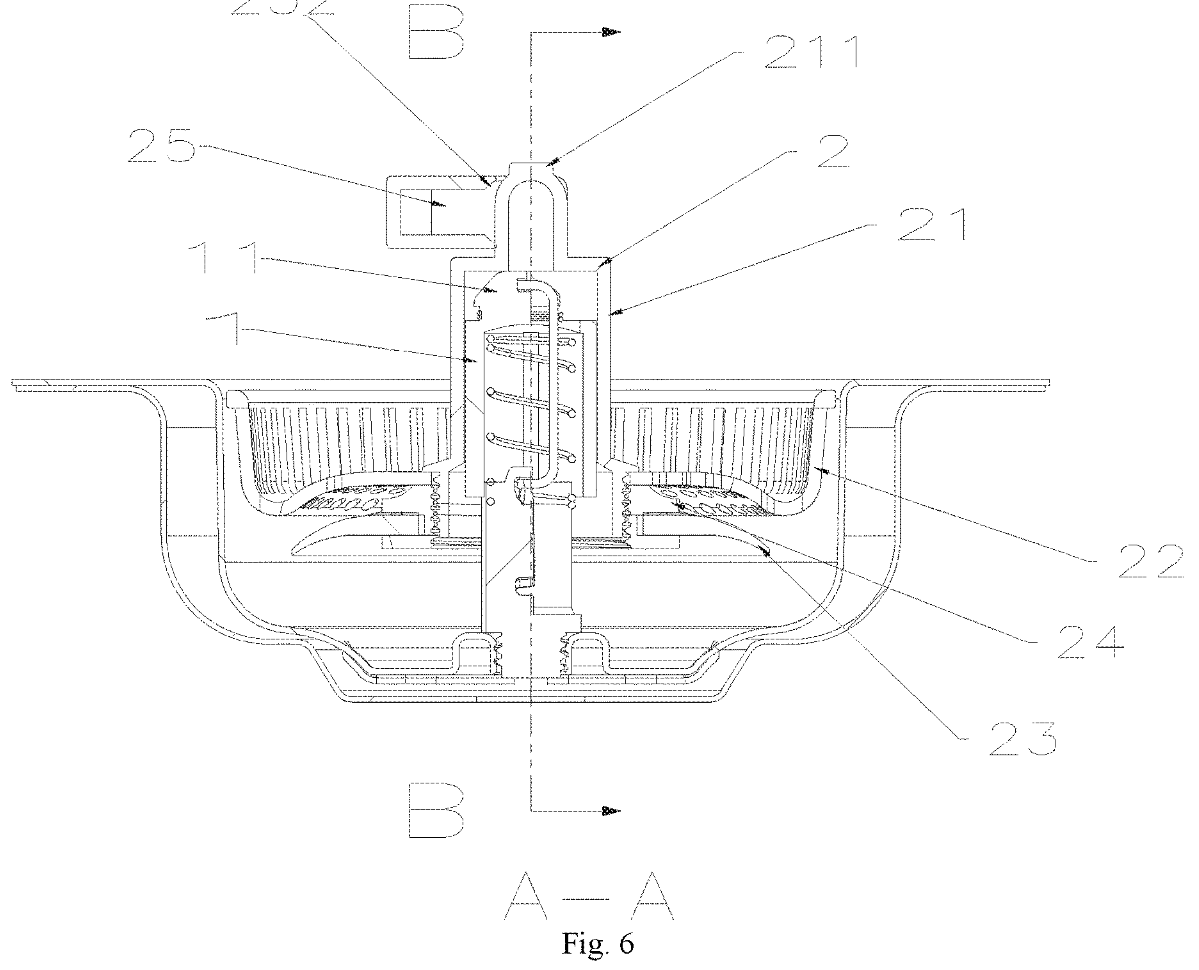
FIG. 6 is a first section view of a drain plug assembly.
Figure 7:
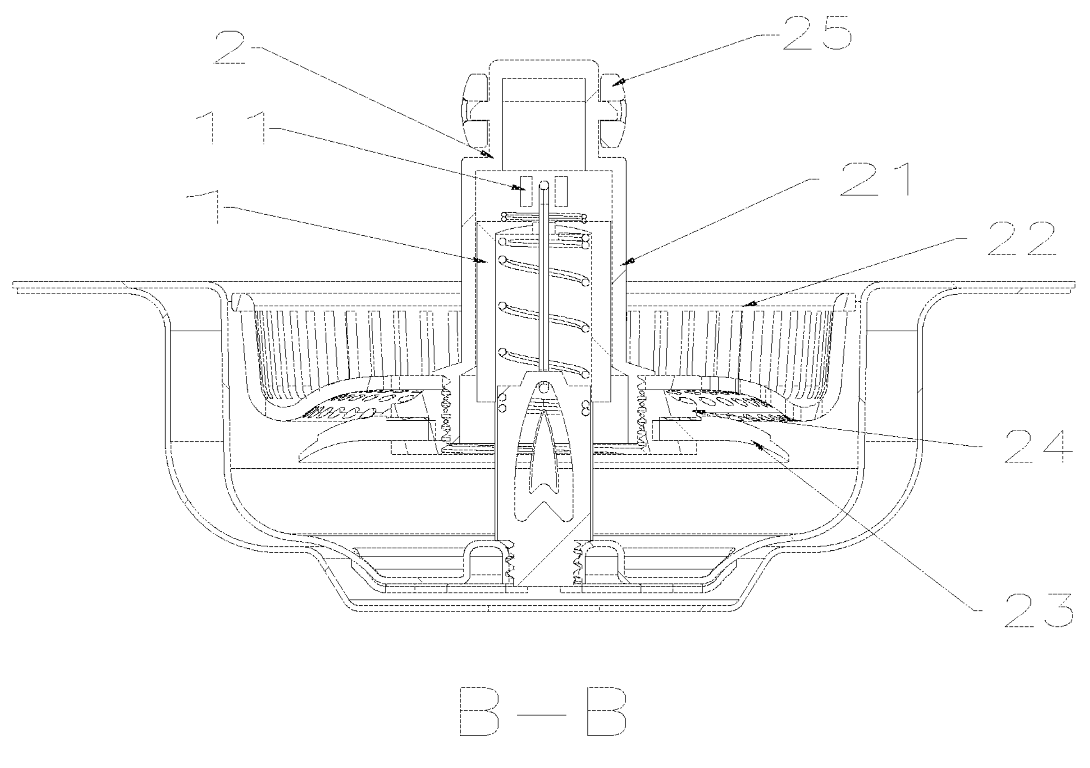
FIG. 7 is a second section view of a drain plug assembly.
Figure 8:
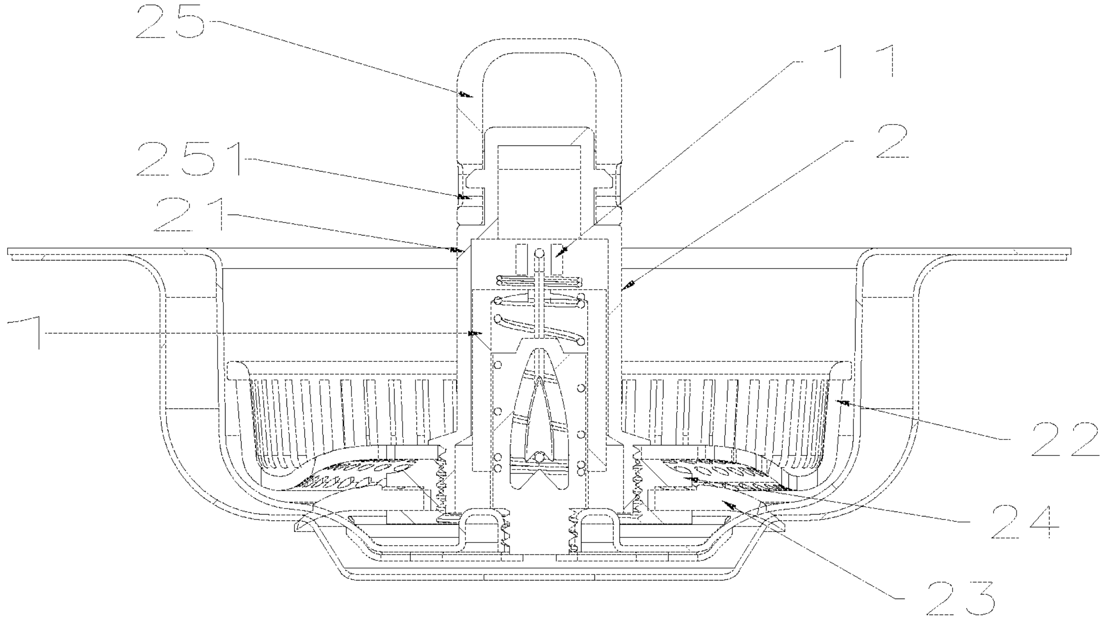
FIG. 8 is a third section view of a drain plug assembly.
Figure 9:
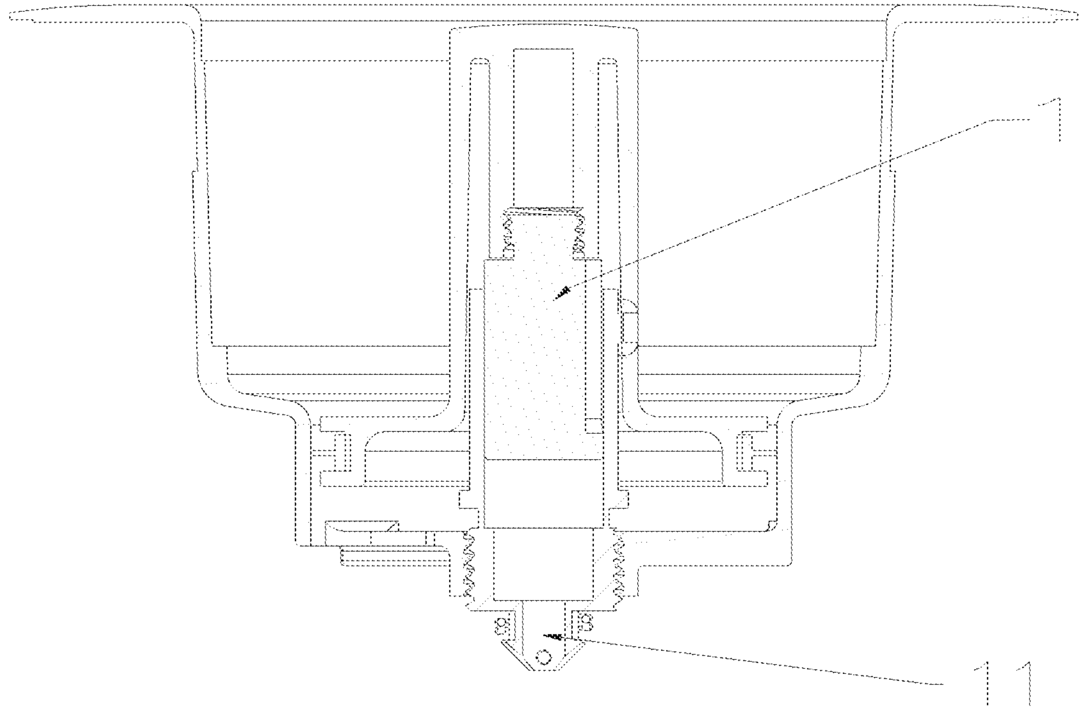
FIG. 9 is a drain plug assembly in the related art.

FIG. 1 shows in a drainage state, a handle is laid flat, and a plastic water filter basket is provided, with a schematic diagram of an interlayer of a drainage outlet. FIG. 2 shows in a water plugging state, a handle is pulled up, and a plastic water filter basket is provided, with a schematic diagram of an interlayer of a drainage outlet. FIG. 3 shows in a water plugging state, a handle is pulled up, and a stainless steel water filter basket is provided. FIG. 4 shows in a drainage state, a handle is laid flat, and a stainless steel water filter basket is provided.

The drain stem 1 is inverted, where one end with a protruding tip 11 facing upwards and the other end facing downwards, so as to avoid the interference between the protruding tip 11 and a drainage outlet. It is to be noted that the drain stem 1 is an existing product, and is generally assembled with the drainage outlet through a thread during mounting. The specific mechanism and working principle will not be elaborated herein.

The water filter basket assembly 2 includes a sleeve 21, a water filter basket 22, and a sealing ring 23.

The sleeve 21 is mounted at the top of the drain stem 1 in a sleeving manner, and wraps the protruding tip 11 of the drain stem 1. In the embodiment, the sleeve 21 and the drain stem 1 are assembled and matched through lapped joint.

The water filter basket 22 and the sealing ring 23 are mounted on the sleeve 21 in sequence from top to bottom. In the embodiment, the water filter basket 22 is made of plastic. In other embodiments, the water filter basket may be made of stainless steel. A top surface of the sealing ring 23 is provided with a radial reinforcing rib, which may improve the sealing degree during water plugging. In addition, the sealing ring 23 is assembled by an interference fit, or is integrally formed with the pressing ring 24.

In an embodiment, preferably, a lower part of the sleeve 21 is provided with an annular boss, and the water filter basket 22 is arranged on the annular boss and pressed by a pressing ring 24. Preferably, the pressing ring 24 and the sleeve 21 are assembled through a thread.

In an embodiment, for ease of use, the water filter basket assembly 2 further includes a handle 25. The handle 25 is arranged at a top end of the sleeve 21. Preferably, the top end of the sleeve 21 is provided with a boss, and both sides of the boss are provided with an articulated shaft. A bottom end of the handle 25 is provided with a U-shaped opening, and both sides of the U-shaped opening are provided with through strip-shaped holes 251. The U-shaped opening of the handle 25 is hinged to the boss through the strip-shaped holes 251 and the articulated shaft. In the embodiment, the articulated shaft is fixedly arranged on both sides of the sleeve 21, the U-shaped opening of the handle 25 is opened through deformation, and the articulated shaft is clamped into the strip-shaped holes 251. Preferably, an upper side of an end of the articulated shaft is an inclined plane, which facilitates the assembly of the handle 25.

In an embodiment, the top of the boss is provided with a limiting protrusion 211, and a bottom surface of the U-shaped opening of the handle 25 is provided with a limiting groove 252. The handle 25 is vertically pulled up and down, the limiting protrusion 211 is clamped or inserted into the limiting groove 252, the handle 25 remains vertical, or, the handle 25 is vertically pulled up, the limiting protrusion 211 is separated from the limiting groove 252, and the handle 25 is laid flat.

The handle 25 swings between a flat state and a vertical state. When the water filter basket 22 has too much clutter, the handle 25 is erected to facilitate the lifting of the water filter basket 22, and when cleaning items are placed in the vegetable washing basin, the handle 25 is laid flat to avoid being touched, and the normal use of the vegetable washing basin is not affected.

According to the application, through the adoption of the inverted drain stem 1, the protruding tip which may interfere with the drainage outlet 11 faces upwards to be accommodated in the water filter basket assembly 2 with larger design space, which solves the problems that, for some vegetable washing basins with a relatively small thickness of an interlayer of the drainage outlet, especially products on the American market, the depth of a shell of the drainer is generally shallower than the domestic standard, the internal space of the drainer is narrow, the thickness of the interlayer of the drainage outlet is also relatively small, and the protruding tip may interfere with a rib of the drainage outlet or the bottom interlayer, resulting in the incapability of mounting the drain plug assembly.

The application is exemplarily described in detail above in combination with the drawings. It is apparent that the specific implementation of the application is not limited by the above mode, and various non-substantial modifications made to the method conception and technical solutions of the application, or the conception and technical solutions of the application directly applied to other occasions without modification are all within the scope of protection of the application.

The invention claimed is:

1. A drain plug assembly, comprising a drain stem and a water filter basket assembly; wherein the drain stem comprises at least two telescoping parts which are coupled by a coupling element, wherein the coupling element couples one part to a protruding tip at an opposite end of another part and utilizes a spring as part of an operation of the coupling element;

the protruding tip of the drain stem which is connected to the spring of the drain stem is oriented upward a drain opening while the opposite end of the drain stem facing downward a drain is configured to couple to the drain;

the water filter basket assembly comprises a sleeve, a water filter basket, a handle arranged at a top end of the sleeve and a sealing ring; the sleeve is mounted at a top of the drain stem in a sleeving manner, and wraps the protruding tip of the drain stem; and the water filter basket and the sealing ring are mounted on the sleeve in sequence from top to bottom; and the top end of the sleeve is provided with a boss, and both sides of the boss are provided with an articulated shaft; a bottom end of the handle is provided with a U-shaped opening, and both sides of the U-shaped opening are provided with through strip-shaped holes; and the U-shaped opening of the handle is hinged to the boss through the strip-shaped holes and the articulated shaft.

2. The drain plug assembly according to claim 1, wherein the articulated shaft is fixedly arranged on both sides of the sleeve, the U-shaped opening of the handle is opened through deformation, and the articulated shaft is clamped into the strip-shaped holes; and an upper side of an end of the articulated shaft is an inclined plane.

3. The drain plug assembly according to claim 1, wherein a top of the boss is provided with a limiting protrusion, and a bottom surface of the U-shaped opening of the handle is provided with a limiting groove; and the handle is vertically pulled up and down, the limiting protrusion is clamped or inserted into the limiting groove, the handle remains vertical, or, the handle is vertically pulled up, the limiting protrusion is separated from the limiting groove, and the handle is laid flat.

4. The drain plug assembly according to claim 1, wherein the sleeve and the drain stem are shaped such that they are configured to be securely coupled together through a lapped joint without other fastening structures.

5. The drain plug assembly according to claim 1, wherein the water filter basket is made of plastic or stainless steel.

6. The drain plug assembly according to claim 1, wherein a lower part of the sleeve is provided with an annular boss, and the water filter basket is arranged on the annular boss and pressed by a pressing ring; and the pressing ring and the sleeve are assembled through a thread.

7. The drain plug assembly according to claim 6, wherein the sealing ring and the pressing ring are integrally formed.

8. The drain plug assembly according to claim 6, wherein the sealing ring is arranged in a ring groove on the pressing ring in a sleeving manner.

* * * * *